US 8,055,779 B1
Nov. 8, 2011

(12) United States Patent
Cheng et al.

(54) SYSTEM AND METHOD USING DATA KEYFRAMES

(75) Inventors: Stephen Cheng, Foster City, CA (US); Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 703 days.

(21) Appl. No.: 11/747,156

(22) Filed: May 10, 2007

(51) Int. Cl.
G06F 15/16 (2006.01)
H04N 7/173 (2011.01)

(52) U.S. Cl. ........ 709/227; 709/203; 709/231; 709/236; 725/105; 725/118

(58) Field of Classification Search .......... 709/203, 709/227, 231, 236; 725/105, 118; 715/105, 715/118
See application file for complete search history.

(56) References Cited

U.S. PATENT DOCUMENTS

| | | | |
|---|---|---|---|
| 4,949,169 A | 8/1990 | Lumelsky et al. |
| 5,014,125 A | 5/1991 | Pocock et al. |
| 5,208,665 A | 5/1993 | McCalley et al. |
| 5,247,347 A | 9/1993 | Litteral et al. |
| 5,253,275 A | 10/1993 | Yurt et al. |
| 5,414,455 A | 5/1995 | Hooper et al. |
| 5,513,375 A | 4/1996 | Peters |
| 5,521,630 A | 5/1996 | Chen et al. |
| 5,533,021 A | 7/1996 | Branstad et al. |
| 5,537,408 A | 7/1996 | Branstad et al. |
| 5,553,083 A | 9/1996 | Miller |
| 5,568,181 A | 10/1996 | Greenwood et al. |
| 5,583,561 A | 12/1996 | Baker et al. |
| 5,682,597 A | 10/1997 | Ganek et al. |
| 5,719,786 A | 2/1998 | Nelson et al. |
| 5,768,527 A | 6/1998 | Zhu et al. |
| 5,768,533 A | 6/1998 | Ran |
| 6,014,706 A | 1/2000 | Cannon et al. |
| 6,330,286 B1 | 12/2001 | Lyons et al. |
| 6,373,842 B1 | 4/2002 | Coverdale et al. |
| 6,684,354 B2 | 1/2004 | Fukushima et al. |
| 6,721,794 B2 | 4/2004 | Taylor et al. |
| 6,728,763 B1 | 4/2004 | Chen |
| 6,732,313 B2 | 5/2004 | Fukushima et al. |
| 6,754,715 B1 | 6/2004 | Cannon et al. |

(Continued)

OTHER PUBLICATIONS

U.S. Appl. No. 11/173,985, filed Jun. 30, 2005, entitled "Fast Seek In Streaming Media" by Inventors Srinivas Manapragada, Pritham Shetty, and Asa Whillock.

(Continued)

*Primary Examiner* — Peter-Anthony Pappas
*Assistant Examiner* — Farrukh Hussain
(74) *Attorney, Agent, or Firm* — Fish & Richardson P.C.

(57) ABSTRACT

Methods, systems, and apparatus, including computer program products, for using data keyframes. In one aspect, a method includes storing a data keyframe transmitted as part of a live streaming broadcast; receiving a request from a client to join the live streaming broadcast in-progress; determining that the stored data keyframe was transmitted before the request from the client was received; transmitting the stored data keyframe to the client; and distributing streaming content associated with the live streaming broadcast to the client. Further, the data keyframe can be generated by a publisher of the live streaming broadcast. Distributing streaming content further can include storing a plurality of data keyframes transmitted as part of the live streaming broadcast and transmitting the plurality of stored data keyframes to the client before distributing streaming content associated with the live streaming broadcast to the client.

21 Claims, 5 Drawing Sheets

U.S. PATENT DOCUMENTS

| | | | |
|---|---|---|---|
| 6,766,376 | B2 | 7/2004 | Price |
| 6,792,468 | B1 | 9/2004 | Bloch et al. |
| 6,801,947 | B1 | 10/2004 | Li |
| 6,912,585 | B2 | 6/2005 | Taylor et al. |
| 6,918,077 | B2 | 7/2005 | Fukushima et al. |
| 6,937,657 | B2 | 8/2005 | Wang |
| 7,054,949 | B2 | 5/2006 | Jennings |
| 7,069,311 | B2 | 6/2006 | Gupta et al. |
| 7,076,535 | B2 | 7/2006 | Gupta et al. |
| 7,099,953 | B2 | 8/2006 | Horiuchi et al. |
| 7,124,333 | B2 | 10/2006 | Fukushima et al. |
| 7,290,058 | B2 | 10/2007 | Zhu et al. |
| 7,313,808 | B1 | 12/2007 | Gupta et al. |
| 7,356,245 | B2 | 4/2008 | Belknap et al. |
| 7,356,750 | B2 | 4/2008 | Fukushima et al. |
| 7,359,981 | B2 | 4/2008 | Horiuchi et al. |
| 7,539,393 | B2 | 5/2009 | Dunbar et al. |
| 7,571,246 | B2 | 8/2009 | Virdi et al. |
| 7,698,451 | B2 | 4/2010 | Ganesan |
| 7,734,800 | B2 | 6/2010 | Gupta et al. |
| 7,739,714 | B2 | 6/2010 | Guedalia |
| 2002/0030966 | A1 | 3/2002 | Huggins |
| 2002/0041629 | A1 | 4/2002 | Hannuksela |
| 2002/0143988 | A1 | 10/2002 | Jensen |
| 2003/0033417 | A1 | 2/2003 | Zou et al. |
| 2003/0076826 | A1 | 4/2003 | Blasiak et al. |
| 2004/0098671 | A1* | 5/2004 | Graham et al. ............... 715/527 |
| 2005/0007965 | A1* | 1/2005 | Hagen et al. ................. 370/260 |
| 2005/0021809 | A1 | 1/2005 | Zhu et al. |
| 2005/0025456 | A1 | 2/2005 | Halfant |
| 2005/0033856 | A1 | 2/2005 | Li |
| 2005/0037740 | A1* | 2/2005 | Smith et al. ................ 455/414.1 |
| 2005/0123045 | A1 | 6/2005 | Hannuksela |
| 2005/0183120 | A1 | 8/2005 | Jain et al. |
| 2005/0232290 | A1 | 10/2005 | Mathew et al. |
| 2006/0026294 | A1 | 2/2006 | Virdi et al. |
| 2006/0062216 | A1 | 3/2006 | Li et al. |
| 2006/0104600 | A1 | 5/2006 | Abrams |
| 2006/0242676 | A1* | 10/2006 | Hoshino ....................... 725/105 |
| 2006/0284981 | A1* | 12/2006 | Erol et al. .................. 348/207.1 |
| 2007/0005804 | A1* | 1/2007 | Rideout ....................... 709/246 |
| 2007/0232251 | A1* | 10/2007 | Murthy et al. ............. 455/160.1 |
| 2007/0285394 | A1 | 12/2007 | Lee et al. |
| 2008/0313682 | A1 | 12/2008 | Kajiura |
| 2009/0055471 | A1 | 2/2009 | Kozat et al. |
| 2009/0164655 | A1 | 6/2009 | Pettersson et al. |

OTHER PUBLICATIONS

U.S. Appl. No. 11/173,957, filed Jun. 30, 2005, entitled "Enhanced Seek In Streaming Media" by inventors Srinivas Manapragada, Pritham Shetty, and David Simmons.
http://www.adobe.com/products/aftereffects/pdfs/AdobeStr.pdf, "A Streaming Media Primer", Adobe Dynamic Media Group.
http://www.adobe.com/products/dvcoll/pdfs/compprimer_0306.pdf, "Compression Primer", Adobe Systems Incorporated.

* cited by examiner

SYSTEM AND METHOD USING DATA KEYFRAMES

BACKGROUND

The present disclosure relates to associating one or more data keyframes with a streaming broadcast, and to systems and methods for storing and distributing data keyframes to one or more subscribers of a streaming broadcast.

In the past, transferring large files over a computer network could be a lengthy and unreliable process. Instead, large files, such as files containing audio or video data, typically were downloaded from a server and a local copy was created by the receiving client system. The local copy of the file was then available for use by the client system, such as for playback of media content. Alternatively, large files were distributed to users on portable storage media, such as compact disc ("CD") or digital versatile disc ("DVD").

In the more recent past, increased network bandwidth and computers with greater processing power made it practical to stream content from a server to a client. Further, standardized communication protocols were developed for use by streaming applications. Additionally, the content being streamed could be adapted to comply with the requirements of a communication path, such as through use of variable encoding parameters and/or scalable image resolution.

A client system can subscribe to a streaming broadcast by submitting a request to a streaming server from which the streaming broadcast is available. For example, a user of the client system can view a web page associated with the streaming server and select a link corresponding to the desired streaming broadcast. Once the streaming broadcast has been initiated, packets of data representing the streaming content are distributed to the subscribing client over a broadcast network. The streaming content can include audio, video, data, or any combination thereof. Further, the streaming content can be accessed at the client system as the data packets are received from the streaming server. For example, playback of streaming media content can begin at a subscribing client without waiting for the entire file to be downloaded. Typically, playback of streaming media can begin after only a small percentage of the streaming media content has been stored locally (or "buffered") by the client.

Further, a streaming broadcast can be a live broadcast or a pre-recorded broadcast. In a live broadcast, content is distributed by a streaming server to one or more subscribing clients while the information for the stream is being published to the server. For example, similar to live television, a video presentation of a live event can be captured and published to a streaming server as the event is taking place. As such, the streaming content corresponding to the live event can be presented at a subscribing client in real-time or in near real-time. A live broadcast further can be captured and stored at a streaming server in order to generate a file that can be rebroadcast at a later time.

In a pre-recorded broadcast, information associated with one or more files is provided to a streaming server as content for the streaming broadcast. Information included in the pre-recorded broadcast is not being captured and published to the streaming server during the broadcast. Similar to a live broadcast, however, a pre-recorded broadcast allows a subscribing client to begin accessing the streaming content without first downloading the one or more files being streamed. For example, a streamed file, such as a recording of a previous live broadcast, can be presented at a subscribing client system as content associated with the streamed file is received. In order to reduce the risk of disruptions, a portion of the streamed content can be buffered by the subscribing client before playback is initiated. A pre-recorded broadcast can begin at a scheduled time or on-demand in response to a request by a subscribing client.

Data for a streaming file can be stored sequentially in segments corresponding to the order in which the content will be accessed, such as by frame. For example, image data and audio data corresponding to a particular frame of a video sequence can be stored sequentially in a file such that it precedes data corresponding to a temporally subsequent frame of the same video sequence. Thus, a subscribing client can receive all of the data required to render a frame of the video sequence before it receives data associated with one or more successive frames.

Additionally, because the data required to render a frame of streaming content at a subscribing client is temporally ordered, a subscribing client can join a streaming broadcast that already is in progress. For example, a subscribing client can join a live streaming broadcast of a baseball game at any point during the game. The subscribing client thus will be able to access audio and/or video content associated with the live streaming broadcast from the present point in the game without first having to access content from an earlier portion of the game. Additionally, the subscribing client can subsequently request to access content associated with an earlier portion of a streaming broadcast that was joined in-progress, such as by requesting to access a recorded version of the previously streamed broadcast that is stored in a file.

SUMMARY

This specification describes technologies relating to using data keyframes in a streaming broadcast. A streaming server, such as a server that distributes a live streaming broadcast, can be configured to provide to one or more subscribing clients streaming content including audio, video, data messages, or any combination thereof. Further, the streaming server can distribute one or more data keyframes to a client that subscribes to a live broadcast in-progress. The presented methods include storing one or more data keyframes generated by a publisher. The present inventors recognized the need to store the one or more data keyframes until the publisher stops publishing to the streaming broadcast or until the publisher indicates that a data keyframe is to be deleted. Further, the present inventors recognized the need to store the one or more data keyframes such that they are accessible to the streaming server providing the streaming broadcast. In order to identify a data keyframe to a streaming server, the present inventors recognized that it was beneficial to associate a predetermined indicator with a data keyframe, such as a data keyframe handler name.

The present inventors also recognized the need to associate a stored data keyframe with the particular live broadcast in which it was transmitted. Further, the present inventors recognized the need to determine whether, in response to a client request to join a live broadcast in-progress, any stored data keyframes associated with the broadcast are available. Accordingly, the systems and apparatus described here can implement methods for identifying, storing, and distributing data keyframes to one or more subscribing clients of a live streaming broadcast.

In general, in one aspect, the subject matter can be implemented to include storing a data keyframe transmitted as part of a live streaming broadcast; receiving a request from a client to join the live streaming broadcast in-progress; determining that the stored data keyframe was transmitted before the request from the client was received; transmitting the stored data keyframe to the client; and distributing streaming content associated with the live streaming broadcast to the client.

The subject matter also can be implemented such that the data keyframe is generated by a publisher of the live streaming broadcast. The subject matter further can be implemented to include determining that the publisher is no longer publishing to the live streaming broadcast and deleting the stored data keyframe. Additionally, the subject matter can be implemented to include receiving a clear data message associated with the live streaming broadcast, wherein the clear data message identifies the stored data keyframe and deleting the stored data keyframe in response to the clear data message.

The subject matter also can be implemented to include storing a plurality of data keyframes transmitted as part of the live streaming broadcast and transmitting the plurality of stored data keyframes to the client before distributing streaming content associated with the live streaming broadcast to the client. Further, the subject matter can be implemented such that the data keyframe includes a predetermined identifier. Additionally, the subject matter can be implemented such that the predetermined identifier distinguishes the data keyframe from a data message.

The subject matter also can be implemented such that the data keyframe includes a data keyframe handler name, a data message handler name, and one or more arguments. Further, the subject matter can be implemented to include deleting the data keyframe handler name prior to storing the data keyframe.

In general, in another aspect, the techniques can be implemented as a computer program product, encoded on a computer-readable medium, operable to cause data processing apparatus to perform operations including storing a data keyframe transmitted as part of a live streaming broadcast; receiving a request from a client to join the live streaming broadcast in-progress; determining that the stored data keyframe was transmitted before the request from the client was received; transmitting the stored data keyframe to the client; and distributing streaming content associated with the live streaming broadcast to the client.

Further, the subject matter can be implemented such that the data keyframe is generated by a publisher of the live streaming broadcast. The subject matter also can be implemented to include instructions operable to cause a programmable processor to perform operations including determining that the publisher is no longer publishing to the live streaming broadcast and deleting the stored data keyframe. Additionally, the subject matter can be implemented to include instructions operable to cause a programmable processor to perform operations including receiving a clear data message associated with the live streaming broadcast, wherein the clear data message identifies the stored data keyframe and deleting the stored data keyframe in response to the clear data message.

The subject matter also can be implemented to include instructions operable to cause a programmable processor to perform operations including storing a plurality of data keyframes transmitted as part of the live streaming broadcast and transmitting the plurality of stored data keyframes to the client before distributing streaming content associated with the live streaming broadcast to the client. The subject matter further can be implemented such that the data keyframe includes a predetermined identifier. Additionally, the subject matter can be implemented such that the predetermined identifier distinguishes the data keyframe from a data message.

Further, the subject matter can be implemented such that the data keyframe includes a data keyframe handler name, a data message handler name, and one or more arguments. The subject matter also can be implemented to include instructions operable to cause a programmable processor to perform operations including deleting the data keyframe handler name prior to storing the data keyframe.

In general, in another aspect, the subject matter can be implemented as a system including a publisher configured to publish streaming content associated with a live streaming broadcast and a streaming server configured to perform operations including storing a data keyframe transmitted as part of the live streaming broadcast; receiving a request from a client to join the live streaming broadcast in-progress; determining that the stored data keyframe was transmitted before the request from the client was received; transmitting the stored data keyframe to the client; and distributing streaming content associated with the live streaming broadcast to the client.

The subject matter also can be implemented such that the streaming server is further configured to perform operations including determining that the publisher is no longer publishing to the live streaming broadcast and deleting the stored data keyframe. Additionally, the subject matter can be implemented such that the streaming server is further configured to perform operations including receiving a clear data message associated with the live streaming broadcast, wherein the clear data message identifies the stored data keyframe and deleting the stored data keyframe in response to the clear data message.

The subject matter also can be implemented such that the streaming server is further configured to perform operations including storing a plurality of data keyframes transmitted as part of the live streaming broadcast and transmitting the plurality of stored data keyframes to the client before distributing streaming content associated with the live streaming broadcast to the client. The subject matter further can be implemented such that the data keyframe includes a predetermined identifier. Additionally, the subject matter can be implemented such that the predetermined identifier distinguishes the data keyframe from a data message.

The subject matter also can be implemented such that the data keyframe includes a data keyframe handler name, a data message handler name, and one or more arguments. Additionally, the subject matter can be implemented such that the streaming server is further configured to perform operations including deleting the data keyframe handler name prior to storing the data keyframe. Further, the subject matter can be implemented such that the publisher is integrated with the streaming server.

Particular embodiments of the subject matter described in this specification can be implemented to realize one or more of the following advantages. For example, the subject matter can be implemented to eliminate the need to periodically retransmit one or more data keyframes as part of a live broadcast. Further, the subject matter can be implemented such that the live streaming broadcast will be consistently presented to each subscribing client. The subject matter also can be implemented to ensure that, after a live broadcast has begun, the streaming server can initialize a player application associated with a new subscribing client. Additionally, the subject matter can be implemented to permit a streaming server to distinguish between data keyframes and data messages.

This subject matter can be implemented using an apparatus, a method, a system, a computer program product, or any combination of an apparatus, methods, systems, and computer program products. The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
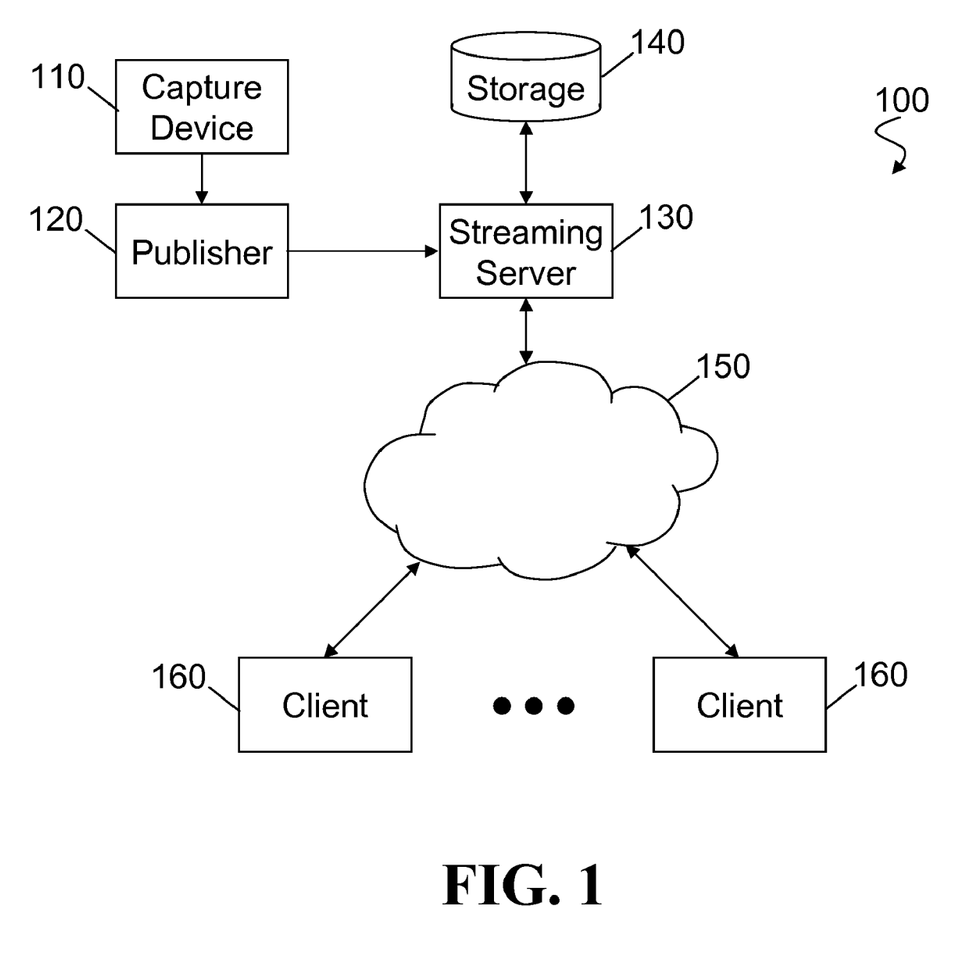
FIG. 1 shows an exemplary content delivery system.

FIG. 1 shows an exemplary content delivery system 100 that can be configured to distribute streaming media content to one or more subscribing clients 160. The content delivery system 100 includes a capture device 110 configured to generate media content, such as audio and/or video data, associated with a live event. The capture device 110 can be any recording device, including one or more microphones, cameras, video cameras, or any combination thereof. Further, the capture device 110 generates the media content corresponding to the live event in real-time.

Media content output from the capture device 110 is provided to a publisher 120, which can be configured to organize the media content into a suitable format for streaming. The publisher 120 can be any device, system, or combination thereof. Further, the capture device 110 can be connected to the publisher 120 through any wired or wireless connection. A broadcast application hosted on the publisher 120 performs real-time encoding of the media content received from the capture device 110. The broadcast application also can include one or more settings to control encoding of the media content. Further, the publisher 120 can generate one or more data messages that include information associated with the live broadcast, such as text messages and control data. A data message can be used to present information through a player application hosted by a client or to control one or more settings associated with the player application.

In an implementation, the publisher 120 also can include hardware configured to perform at least a portion of the media content encoding. For example, the capture device 110 can be coupled to a media capture card associated with the publisher 120. Further, the media capture card can include one or more digital signal processors configured to perform media content encoding operations.

The publisher 120 publishes the encoded media content to a streaming server 130 as streaming content. In some implementations, the streaming server 130 can be a server cluster. With respect to a live broadcast, the capture, encoding, and publishing operations are performed substantially in real-time. The publisher 120 can be coupled to the streaming server 130 through a direct connection, such as a dedicated interface, or through an indirect connection, such as a local area network (LAN) connection. Further, the connection between the publisher 120 and the streaming server 130 can be wired, wireless, or a combination thereof.

A streaming application hosted on the streaming server 130 makes the streaming content accessible to one or more subscribing clients 160. For example, the streaming server 130 can receive a connection request from a subscribing client 160 and respond by distributing streaming content to that client. A player application hosted on the subscribing client 160 further can be configured to receive and present the streaming content. In another implementation, the streaming server 130 can stream content to the one or more subscribing clients 160 through a web site accessible on a private or public network, such as a LAN or an internetwork, such as the Internet. The streaming content associated with a broadcast that is made available on the web site is distributed to any client that connects to that stream.

The publisher 120 further can transmit one or more data messages to the streaming server 130 during the live broadcast, which can be incorporated into the streaming content. A data message includes a handler name and one or more arguments. The handler name identifies the data message. In an implementation, the handler name can be a unique identifier. Further, the one or more arguments are specified by the publisher and can be any information or instruction that is to be distributed to the one or more clients subscribing to the live broadcast.

A player application hosted at a subscribing client 160 can be configured to pass a received data message to an appropriate handler based on the handler name included in the data message. The handler performs the function defined by the data message. For example, a data message included in a streaming broadcast can include information in one or more arguments that identifies the sponsor of the broadcast. Upon receiving the data message, the player application hosted on the subscribing client 160 can display the sponsor information as part of the broadcast. Similarly, a data message can include one or more arguments specifying metadata associated with presenting the streaming content. For example, the metadata can include display dimensions that a player application should use to present at least a portion of the broadcast. Thus, a handler associated with the player application can size a display area corresponding to the streaming broadcast in accordance with the dimensions specified by the data message.

Additionally, a storage 140 can be associated with the streaming server 130. The storage 140 can be configured to store at least a portion of a streaming broadcast or information associated with a streaming broadcast. For example, a live streaming broadcast can be recorded in part or in its entirety so that the broadcast can be accessed in the future, such as in response to a client request. The recording of the live streaming broadcast can be saved in one or more files on the storage 140. Further, the storage 140 can be implemented using any storage device, including magnetic, optical, or electrical storage devices. In an implementation, the storage 140 can be integrated with the streaming server 130. Alternatively, the storage 140 can be a separate storage device, such as a data server. Additionally, the storage 140 can be used to store information associated with a live broadcast, such as one or more data messages, for subsequent use during the broadcast.

The one or more subscribing clients 160 access the streaming broadcast over a distribution network 150, which can be a public network, such as the Internet, a private network, or a combination thereof. For example, a subscribing client 160 can transmit a request over the distribution network 150 to the streaming server 130 to receive a streaming broadcast. Further, the streaming broadcast is distributed to the subscribing client 160 over the distribution network 150. Additionally, the streaming server 130 can be configured to distribute a plurality of streaming broadcasts, which can be selectively accessed by one or more subscribing clients 160.

Figure 2:
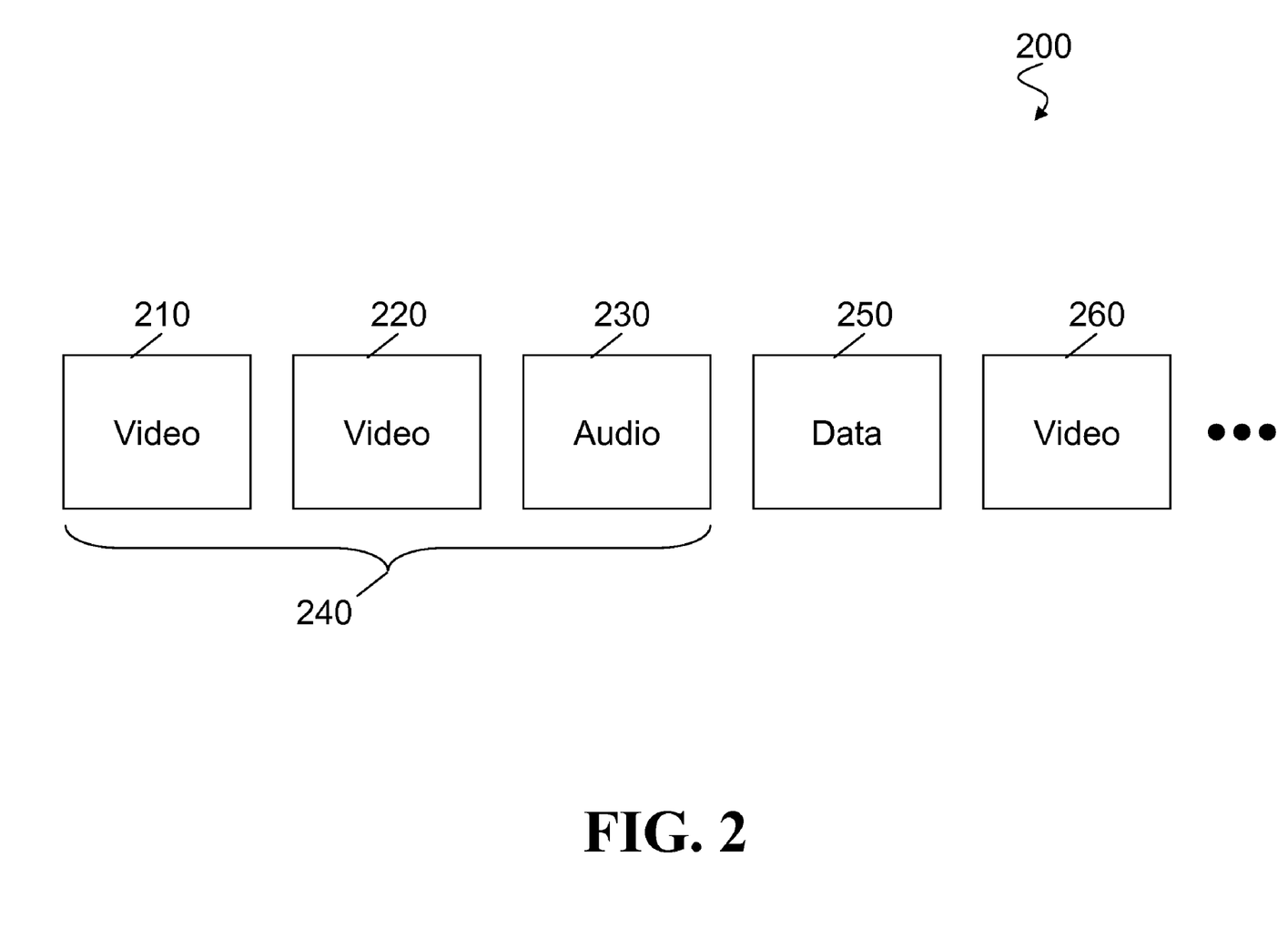
FIG. 2 shows an example of streaming content distributed by a streaming server.

FIG. 2 shows an example of streaming content 200 distributed by a streaming server, such as a portion of a broadcast received by a subscribing client. The streaming content 200 can include a plurality of packets, such as video packets, audio packets, and data packets. For example, the streaming content 200 can include a first video packet 210, a second video packet 220, and an audio packet 230 that are associated with a frame of media content 240. Further, the first and second video packets 210 and 220, and the audio packet 230 represent the information used to render the frame of media content 240. Thus, the corresponding frame of the broadcast can be presented once the first and second video packets 210 and 220, and the audio packet 230 have been received and processed by the player application associated with the subscribing client. The number of packets used to transmit a frame of media content associated with a streaming broadcast can vary depending on numerous factors, including the amount of data required to represent the frame and the amount of data that can be transmitted in a packet.

Further, the streaming content 200 can include a data packet 250 that contains a data message. The data packet 250 can be included in the streaming content 200 before a packet associated with a next frame, such as a next video packet 260. For example, the data packet 250 can include additional information to be presented in conjunction with the streaming broadcast or metadata specifying one or more functions to be performed at the subscribing client. As described above, the data message contained in the data packet 250 is generated by the publisher and distributed to each of the one or more presently subscribing clients by the streaming server. In an implementation, two or more data packets can be used to transmit a data message. Further, as with video and audio packets, the data packet 250 received in association with the streaming content 200 can be discarded by the subscribing client once the data packet 250 has been processed by the player application.

A subscribing client can join a streaming broadcast at any time prior to termination of the broadcast. If a streaming broadcast is joined in progress, including a live broadcast, the subscribing client begins receiving the streaming content 200 from the point in time at which the broadcast was joined. Further, the subscribing client can render frames of the streaming broadcast from the streaming content 200 and present them as soon as practicable, such as after the next video keyframe is received. Alternatively, the current video keyframe can be transmitted to a subscribing client that joins a streaming broadcast in-progress.

Figure 3:
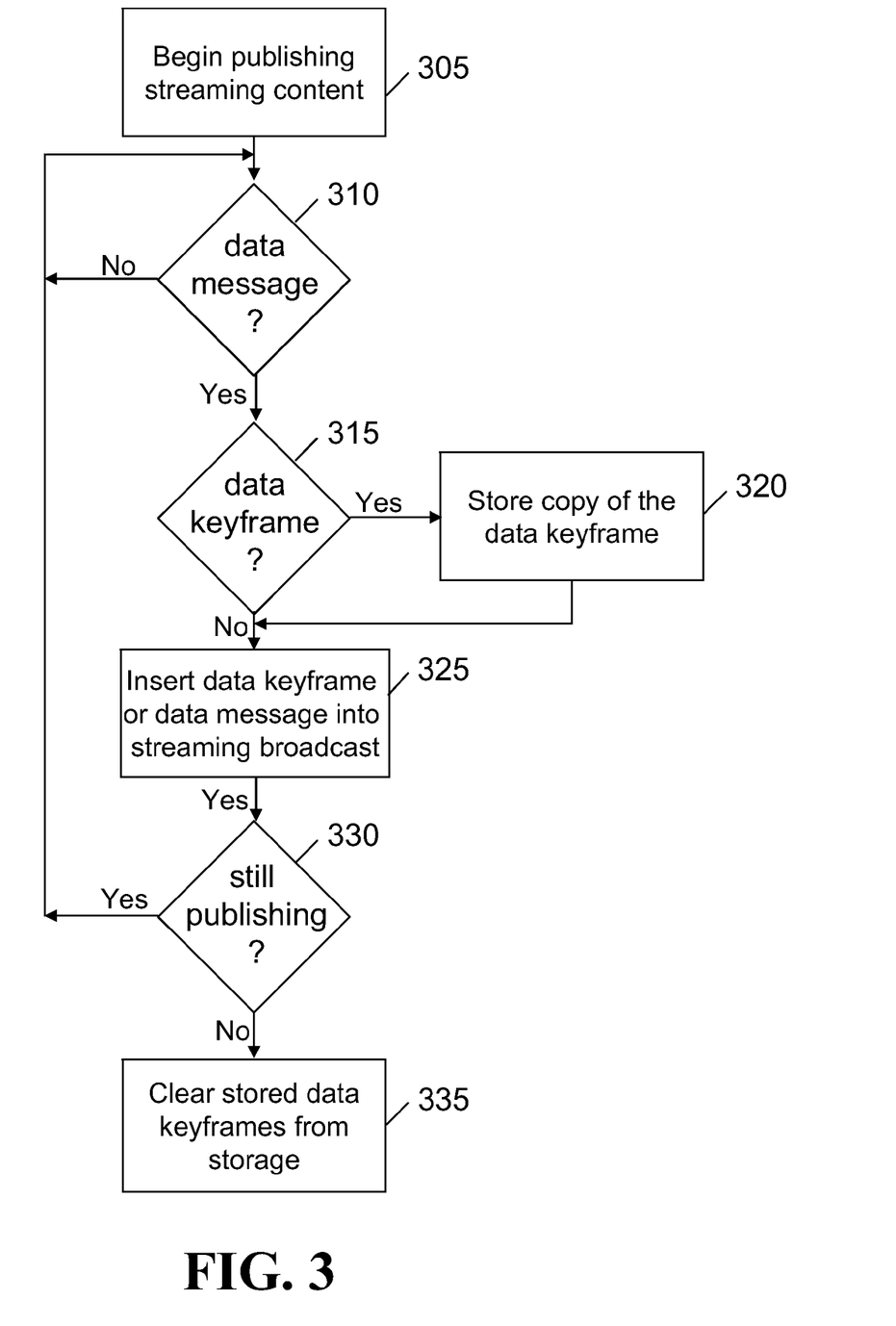
FIG. 3 shows a flowchart describing an exemplary process for publishing one or more data keyframes to a streaming server during a live streaming broadcast.

Additionally, some information associated with an earlier portion of the broadcast also can be provided to a subscribing client joining the broadcast in-progress. For example, a publisher can designate one or more data messages associated with a live streaming broadcast as data keyframes that are to be stored over at least the period for which the publisher is publishing to the live streaming broadcast. A data keyframe can be stored at or accessible to a streaming server distributing content corresponding to the live streaming broadcast. FIG. 3 shows a flowchart describing an exemplary process for publishing one or more data keyframes to a streaming server during a live streaming broadcast.

During the live streaming broadcast, a publisher publishes 305 streaming content to a streaming server that distributes the streaming content to one or more subscribing clients. For example, the publisher transmits to the streaming server audio and video packets that contain information representing the individual frames of the live broadcast. Further, the streaming content can include data packets corresponding to one or more data messages. In an implementation, only one publisher can publish streaming content corresponding to the streaming broadcast at any given point in the broadcast. Further, the publisher that is currently publishing must stop publishing, or unpublish from the broadcast, before a different publisher can begin publishing streaming content to the live streaming broadcast.

The streaming server evaluates the streaming content received from the publisher to determine 310 whether a data message has been received. The streaming server continues to monitor the streaming content for data messages until the publisher stops publishing content associated with the streaming broadcast. Further, the streaming server resumes monitoring when a new publisher begins publishing content associated with the streaming broadcast. Upon receipt of a data message, the streaming server further determines 315 whether the publisher had designated the data message to be a data keyframe.

To identify a data message as a data keyframe, the publisher can include a predetermined identifier, such as a specific character or string of characters, in a field of the data message. In some implementations, the publisher can use a specific naming convention to generate a handler name that identifies the data message as a data keyframe. Further, the publisher can generate a special handler name to use as the data keyframe handler name. The special handler name can include a particular character or symbol, such as the "@" symbol.

For example, the data keyframe handler name @setDataFrame can be used to identify the associated data message as a data keyframe. Additionally, the naming convention used can result in a handler name that is illegal or unsupported for non-data keyframe data messages. The data keyframe thus can be readily processed by a handler associated with the streaming server.

If the streaming server determines that the data message is a data keyframe, the streaming server stores 320 a copy of the data keyframe in a storage and associates the copy with the live streaming broadcast in which it was received. The data keyframe can be stored in any volatile or non-volatile memory accessible to the streaming server. Further, the data keyframe can be stored at least until the publisher stops publishing the streaming content or until the data keyframe is cleared.

Once the data keyframe has been identified, the streaming server can delete the predetermined identifier from the data keyframe. A data keyframe that contains an illegal or unsupported predetermined identifier can thus be converted into a data message that can be processed by a player application associated with a subscribing client. For example, if a special handler name is used to identify a data keyframe, the special handler name can be deleted before the data keyframe is stored or distributed to the subscribing clients. Further, a second handler name can be included in the data keyframe, which can be used as the data message handler name once the special handler name used to identify the data keyframe has been deleted.

For example, when the streaming server identifies a data keyframe in a live streaming broadcast, the streaming server can trap the data keyframe. A live streaming broadcast can include the following instructions:

```
ns=new NetStream(nc);
ns.onStatus=function (info)
{
If (info.code=="NetStream.Publish.Start")
{
   metaData=new Object( )
   metaData.title="myStream";
   metaData.width=400;
   metaData.height=200;
``` this.send("@setDataFrame", "on MetaData", meta-
Data);
this.attachVideo(Camera.get( ));
}

Upon detecting the handler name @setDataFrame, the streaming server can store the data keyframe. Further, the streaming server can delete the handler name @setDataFrame from the data keyframe and on MetaData can be used as the data message handler name. Additionally, the argument metaData included in the data keyframe indicates to the streaming server that the values corresponding to metaData.title, metaData.width, and metaData.height are to be stored in conjunction with the data keyframe.

The data message handler name also can uniquely identify the message associated with the data keyframe. Thus, a stored data keyframe can be replaced by a subsequently received data keyframe that has an identical data message handler name. For example, if a first data keyframe is received that includes metadata specifying a particular display configuration and a second data keyframe is subsequently received that has an identical data message handler name, the display configuration metadata specified by the second data keyframe will replace the display configuration metadata specified by the first data keyframe. If the data message handler name is utilized as a unique identifier, a plurality of data keyframes can be identified using a single predetermined identifier, such as a common special handler name.

The streaming server also distributes the data keyframe with the streaming broadcast by inserting 325 the data keyframe into the streaming broadcast. The streaming server can insert the data keyframe into the streaming broadcast at any time before, during, or after storing the data keyframe. Thus, the data message represented by the data keyframe is distributed to the presently subscribing clients receiving the live streaming broadcast. The data keyframe also can be reformatted before it is distributed to one or more subscribing clients, such as by deleting the predetermined identifier. Alternatively, the data keyframe can be distributed as it was received.

Similarly, if the received data message is not a data keyframe, the data message also can be inserted 325 into the streaming broadcast for distribution to the subscribing clients. A data message that is not identified as a data keyframe, however, need not be stored and accessible to the streaming server and need not be available to subscribing clients that subsequently join the broadcast. The one or more currently subscribing clients then process the received data message and perform any associated functions.

The streaming server further determines 330 whether the publisher is still publishing content associated with the live streaming broadcast. If the publisher is no longer publishing streaming content associated with the live streaming broadcast, the streaming server can clear 335 all of the stored data keyframes associated with the live streaming broadcast from storage. Otherwise, the streaming server continues to monitor the streaming content to determine 310 whether a data message has been received.

In some implementations, the publisher also can clear one or more stored data keyframes during a live streaming broadcast. For example, the publisher can transmit a predetermined clear data message, such as a message including the command @clearDataFrame, to the streaming server. The clear data message can identify a stored data keyframe. Upon receiving the clear data message, the streaming server can delete the corresponding data keyframe from storage. The clear data message can include one or more unique attributes to identify the data keyframe to be cleared, such as a data keyframe handler name or a data message handler name.

Once cleared, a data keyframe is no longer available at the streaming server. In some implementations, a clear data message can identify a plurality of data keyframes that are to be cleared by the streaming server.

Figure 4:
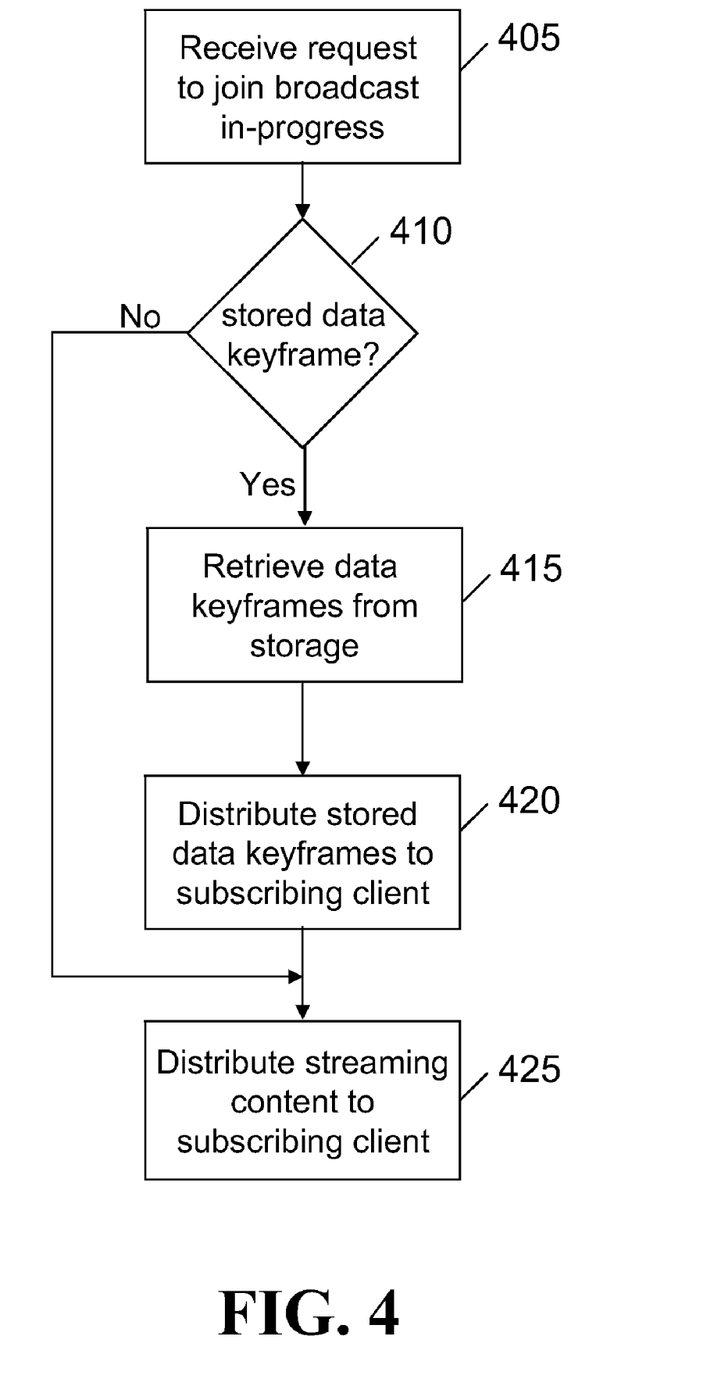
FIG. 4 shows a flowchart describing an exemplary process for permitting a subscribing client to join a live streaming broadcast in-progress.

FIG. 4 shows a flowchart describing an exemplary process for permitting a subscribing client to join a live streaming broadcast in-progress. The process can include distributing one or more previously transmitted data keyframes to a subscribing client that joins the broadcast in-progress. The streaming server hosting the live streaming broadcast can receive 405 a subscription request from a client system to join the broadcast in-progress. The subscription request can be generated by an application hosted on the client system, such as a player application configured to display a streaming broadcast. Further, the subscription request can be received at any time before the end of the live streaming broadcast. Additionally, the live streaming broadcast can be transmitted either as a unicast or a multicast broadcast.

Upon receiving the subscription request, the streaming server determines 410 whether any data keyframes associated with the corresponding live broadcast have been stored. For example, the streaming server can search the storage to determine whether any stored data keyframes are associated with the live streaming broadcast. Alternatively, a flag corresponding to the live streaming broadcast can be set when at least one data keyframe associated with the broadcast has been stored. The flag also can be reset if one or more clear data messages are received that delete from storage all of the data keyframes associated with the broadcast. If there are no stored data keyframes associated with the live streaming broadcast, the streaming server can begin distributing 425 streaming content to the subscribing client that is joining the broadcast in-progress.

If one or more stored data keyframes are associated with the live streaming broadcast, the streaming server can retrieve 415 the one or more corresponding data keyframes from storage. For example, the stored data keyframes can be retrieved and queued for transmission to the subscribing client that is joining the broadcast in-progress. In some implementations, the stored data keyframes are transmitted sequentially in the order they were received during the live broadcast. In other implementations, the stored data keyframes can be ordered for distribution in accordance with one or more other criteria, such as the type of metadata included in the data keyframes or priorities specified by the publisher.

Further, the stored data keyframes also are distributed 420 to the subscribing client that is joining the live broadcast in-progress. For example, the streaming server can generate one or more data packets containing the stored data keyframes. Additionally, as the stored data keyframes were previously transmitted during the live broadcast, the one or more data packets can be distributed only to the subscribing client joining the broadcast in-progress.

The streaming content associated with the live streaming broadcast also is distributed 425 to the subscribing client if one or more stored data keyframes are associated with the broadcast. In some implementations, the subscribing client joining a live streaming broadcast in-progress receives all of the stored data keyframes before receiving any of the streaming content. Thus, a subscribing client that joins the broadcast in-progress is initialized with the data that the publisher elected to distribute to all subscribing clients before the subscribing client can begin rendering the streaming content. In another implementation, the stored data keyframes can be distributed to a subscribing client that joins the live streaming broadcast in-progress within an initial period after the client begins receiving streaming content associated with the broadcast. Further, the stored data keyframes can be transmitted to the subscribing client in a particular order. For example, stored data keyframes specifying configuration settings can be transmitted before stored data keyframes containing supplemental information.

Figure 5:
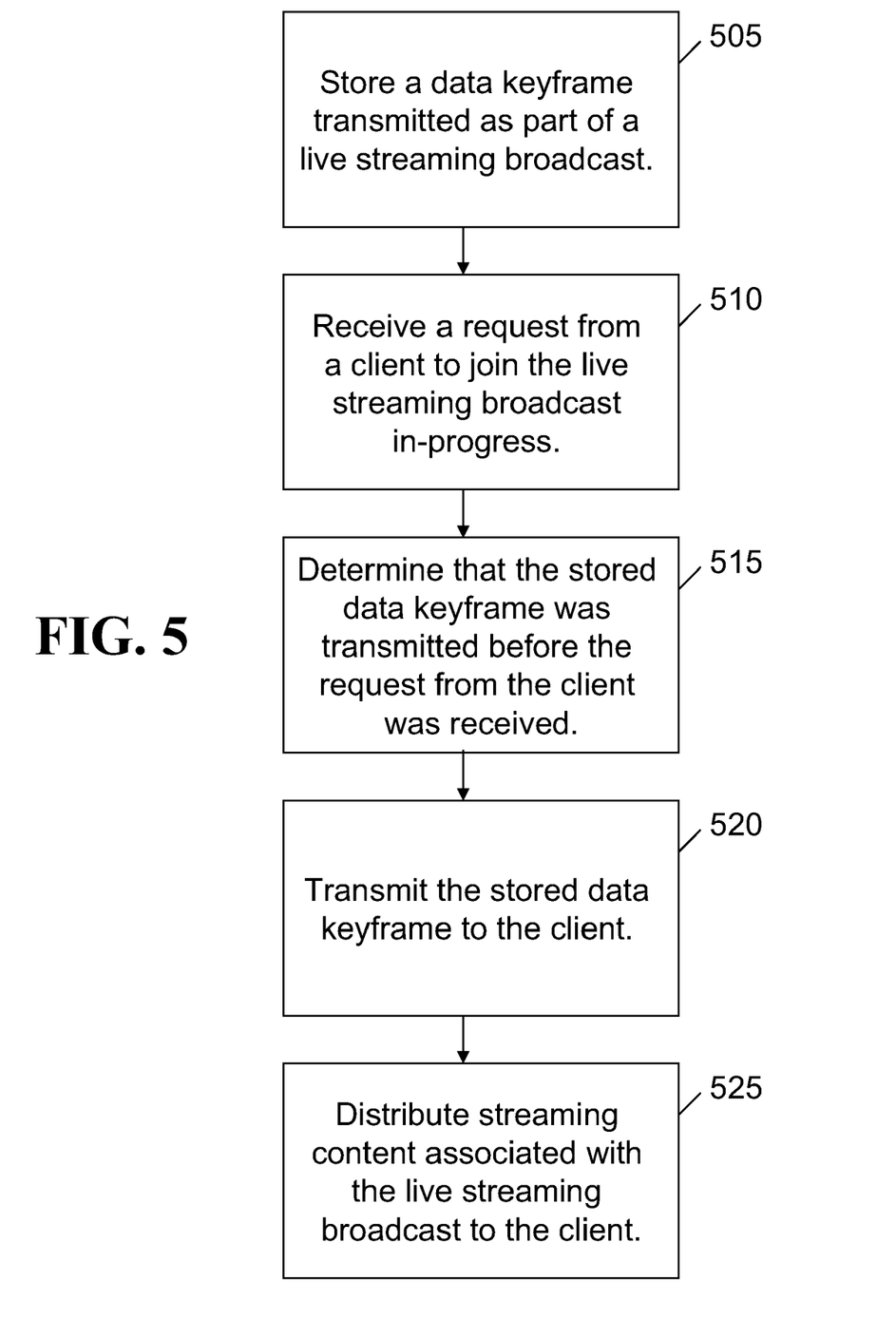
FIG. 5 shows a computer-implemented method of distributing streaming content.

FIG. 5 shows a computer-implemented method of distributing streaming content. Initially, a data keyframe transmitted as part of a live streaming broadcast can be stored 505. A request from a client to join the live streaming broadcast in-progress can be received 510. It is determined 515 that the stored data keyframe was transmitted before the request from the client was received. The stored data keyframe is transmitted 520 to the client. Once the stored data keyframe has been transmitted to the client, streaming content associated with the live streaming broadcast can be distributed 525 to the client.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method of distributing data keyframes, the method comprising:
    storing, by a computer-system comprising a processor and one or more storage devices, a data keyframe transmitted as part of a live streaming broadcast comprising media content frames, the data key frames being distinct from the media content frames, wherein the data keyframe includes a predetermined identifier that distinguishes the data keyframe from a data message that is distributed as part of the live streaming broadcast but not stored for distribution to clients who join the live streaming broadcast after the data message has been distributed;
    receiving a request from a client to join the live streaming broadcast in-progress;
    determining that the stored data keyframe was transmitted before the request from the client was received;
    transmitting the stored data keyframe to the client, wherein the stored data keyframe comprises one or more functions to be performed at the client; and
    distributing streaming content, including at least a portion of the media content frames, associated with the live streaming broadcast to the client.

2. The computer-implemented method of claim 1, wherein the data keyframe is generated by a publisher of the live streaming broadcast.

3. The computer-implemented method of claim 2, further comprising:
    determining that the publisher is no longer publishing to the live streaming broadcast; and
    deleting the stored data keyframe in response to the determining that the publisher is no longer publishing to the live streaming broadcast.

4. The computer-implemented method of claim 1, further comprising:
    receiving a clear data message associated with the live streaming broadcast, wherein the clear data message identifies the stored data keyframe; and
    deleting the stored data keyframe in response to the clear data message.

5. The computer-implemented method of claim 1, further comprising:
    storing a plurality of data keyframes transmitted as part of the live streaming broadcast; and
    transmitting the plurality of stored data keyframes to the client before distributing streaming content associated with the live streaming broadcast to the client.

6. The computer-implemented method of claim 1, wherein the data keyframe includes a data keyframe handler name, a data message handler name, and one or more arguments.

7. The computer-implemented method of claim 6, further comprising deleting the data keyframe handler name prior to storing the data keyframe.

8. A computer program product, encoded on a non-transitory computer-readable medium, operable to cause data processing apparatus to perform operations comprising:
    storing a data keyframe transmitted as part of a live streaming broadcast comprising media content frames, the data key frame being distinct from the media content frames, wherein the data keyframe includes a predetermined identifier that distinguishes the data keyframe from a data message that is distributed as part of the live streaming broadcast but not stored for distribution to clients who join the live streaming broadcast after the data message has been distributed;
    receiving a request from a client to join the live streaming broadcast in-progress;
    determining that the stored data keyframe was transmitted before the request from the client was received;
    transmitting the stored data keyframe to the client, wherein the stored data keyframe comprises one or more functions to be performed at the client; and
    distributing streaming content, including at least a portion of the media content frames, associated with the live streaming broadcast to the client.

9. The computer program product of claim 8, wherein the data keyframe is generated by a publisher of the live streaming broadcast.

10. The computer program product of claim 9, further comprising instructions operable to cause a programmable processor to perform operations comprising:
    determining that the publisher is no longer publishing to the live streaming broadcast; and
    deleting the stored data keyframe in response to the determining that the publisher is no longer publishing to the live streaming broadcast.

11. The computer program product of claim 8, further comprising instructions operable to cause a programmable processor to perform operations comprising:
    receiving a clear data message associated with the live streaming broadcast, wherein the clear data message identifies the stored data keyframe; and
    deleting the stored data keyframe in response to the clear data message.

12. The computer program product of claim 8, further comprising instructions operable to cause a programmable processor to perform operations comprising:
    storing a plurality of data keyframes transmitted as part of the live streaming broadcast; and
    transmitting the plurality of stored data keyframes to the client before distributing streaming content associated with the live streaming broadcast to the client.

13. The computer program product of claim 8, wherein the data keyframe includes a data keyframe handler name, a data message handler name, and one or more arguments.

14. The computer program product of claim 13, further comprising instructions operable to cause a programmable processor to perform operations comprising deleting the data keyframe handler name prior to storing the data keyframe.

15. A system comprising:
a publisher configured to publish streaming content associated with a live streaming broadcast; and
a streaming server comprising a hardware processor and configured to perform operations comprising:
- storing a data keyframe transmitted as part of the live streaming broadcast comprising media content frames, the data key frames being distinct from the media content frames, wherein the data keyframe includes a predetermined identifier that distinguishes the data keyframe from a data message that is distributed as part of the live streaming broadcast but not stored for distribution to clients who join the live streaming broadcast after the data message has been distributed;
- receiving a request from a client to join the live streaming broadcast in-progress;
- determining that the stored data keyframe was transmitted before the request from the client was received;
- transmitting the stored data keyframe to the client, wherein the stored data keyframe comprises one or more functions to be performed at the client; and
- distributing streaming content, including at least a portion of the media content frames, associated with the live streaming broadcast to the client.

16. The system of claim 15, wherein the streaming server is further configured to perform operations comprising:
- determining that the publisher is no longer publishing to the live streaming broadcast; and
- deleting the stored data keyframe in response to the determining that the publisher is no longer publishing to the live streaming broadcast.

17. The system of claim 15, wherein the streaming server is further configured to perform operations comprising:
- receiving a clear data message associated with the live streaming broadcast, wherein the clear data message identifies the stored data keyframe; and
- deleting the stored data keyframe in response to the clear data message.

18. The system of claim 15, wherein the streaming server is further configured to perform operations comprising:
- storing a plurality of data keyframes transmitted as part of the live streaming broadcast; and
- transmitting the plurality of stored data keyframes to the client before distributing streaming content associated with the live streaming broadcast to the client.

19. The system of claim 15, wherein the data keyframe includes a data keyframe handler name, a data message handler name, and one or more arguments.

20. The system of claim 19, wherein the streaming server is further configured to perform operations comprising deleting the data keyframe handler name prior to storing the data keyframe.

21. The system of claim 15, wherein the publisher is integrated with the streaming server.

* * * * *

UNITED STATES PATENT AND TRADEMARK OFFICE
CERTIFICATE OF CORRECTION

| | | |
|---|---|---|
| PATENT NO. | : 8,055,779 B1 | Page 1 of 1 |
| APPLICATION NO. | : 11/747156 | |
| DATED | : November 8, 2011 | |
| INVENTOR(S) | : Cheng et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this
Twentieth Day of March, 2012

David J. Kappos
*Director of the United States Patent and Trademark Office*